United States Patent [19]

Gross et al.

[11] 4,368,095

[45] Jan. 11, 1983

[54] HEATING DEVICE FOR BLANK-SHAPING APPARATUS

[75] Inventors: Helmut Gross; Hermann Hauck, both of Hochheim, Fed. Rep. of Germany

[73] Assignee: AB Akerlund & Rausing, Sweden

[21] Appl. No.: 201,403

[22] PCT Filed: Mar. 3, 1980

[86] PCT No.: PCT/SE80/00061

§ 371 Date: Nov. 3, 1980

§ 102(e) Date: Oct. 27, 1980

[87] PCT Pub. No.: WO80/01776

PCT Pub. Date: Sep. 4, 1980

[30] Foreign Application Priority Data

Mar. 3, 1979 [DE] Fed. Rep. of Germany ....... 2908396

[51] Int. Cl.³ .......................... B32B 31/00; C09J 5/02

[52] U.S. Cl. .................................... 156/497; 156/498; 156/499; 156/282; 156/308.4; 493/134; 493/167

[58] Field of Search ............... 156/497, 498, 499, 500, 156/308.4, 535, 218, 320, 309.9, 282, 82, 245, 224; 493/134, 167, 179, 196; 53/376; 118/59, 101, 105, 108; 427/374.5, 208.2, 224; 425/407

[56] References Cited

U.S. PATENT DOCUMENTS

| | | | |
|---|---|---|---|
| 1,882,049 | 10/1932 | Wellman | 493/96 |
| 3,511,140 | 5/1970 | Hoyrup | 493/134 |
| 3,610,114 | 10/1971 | Kaminsky | 493/134 |
| 3,713,952 | 1/1973 | Schafer et al. | 493/134 |
| 3,751,876 | 8/1973 | Oakley et al. | 156/282 |
| 3,789,746 | 2/1974 | Martensson et al. | 493/134 |
| 4,197,789 | 4/1980 | Moen | 493/96 |

*Primary Examiner*—Edward C. Kimlin
*Assistant Examiner*—L. Falasco
*Attorney, Agent, or Firm*—Lerner, David, Littenberg & Samuel

[57] ABSTRACT

Apparatus for heating a cardboard blank (2) coated with a synthetic material include an inhibitor (21, 22) which inhibits heat transferred from the synthetic coating to the cardboard blank from raising the temperature of predetermined portions of the cardboard blank beyond a selected value.

10 Claims, 7 Drawing Figures

HEATING DEVICE FOR BLANK-SHAPING APPARATUS

FIELD OF THE INVENTION

The present invention relates to apparatus for heating synthetic coatings applied to cardboard blanks, and, more particularly, to such apparatus which are especially useful for forming such blanks into generally bowl-shaped containers. These containers can be used to package foodstuffs, such as baked goods.

BACKGROUND OF THE INVENTION

It is known to fold paper or cardboard blanks into bowl-shaped containers, which can be filled with a powder or baked foodstuffs and then covered by a lid. These bowl-shaped containers, such as the one disclosed in German Offenlegungsscrift No. 28 19 708, can include a paper and/or cardboard substrate, which is printed on with ink in an appealing manner and coated, on an exterior surface, with a layer of polypropylene. An interior surface of the substrate is coated with a layer of polyethylene, which acts as a laminating agent for a piece of aluminum foil laminated to the polyethylene. After the aluminum foil is laminated to the polyethylene, a separating agent is applied by a lacquering machine, so that the baked goods or other contents of the container can be easily removed therefrom.

The choice of coatings for the cardboard substrate is determined primarily by the intended use for the container. If, for example, the container is filled with a powdered material to be baked in an oven after removal of the lid, then the coating must withstand temperatures of about 200° C., because such baking processes are normally carried out at a temperature of about 175° C. for approximately forty-five minutes. If the composition of the laminate is the same as the one described in German Offenlegungsscrift No. 28 19 708, then there are problems in that leaks can be formed in the vicinity of the corners of the container, due to difficulities in sealing the aluminum foil, especially if the aluminum foil has been coated with the separating agent.

Inasmuch as the temperature limit for the baking process is determined by the synthetic materials employed as the coatings, there was a need for different coatings which would facilitate heat-sealing and withstand the temperatures experienced during the baking process. For example, the temperature limit lies in a range of from about 100° C. to about 105° C. for polyethylene, in a range of from about 145° C. to about 150° C. for polypropylene, and in a range of from about 220° C. to about 225° C. for polyester, such as PBTP or PETP.

The polyesters are the most difficult synthetic materials to heat-seal. This heat-sealing difficulty results from the relatively short temperature range between the liquid and solid states of the polyesters.

In the past, heat for heat-sealing the blanks has been transferred through the cardboard substrate to the synthetic coating. However, transferring heat through the cardboard substrate can burn the cardboard, thereby creating brown spots which detrimentally affect the appearance of the completed container. Also, the printing ink applied to the cardboard could be damaged by being heated too much.

Synthetic coatings disposed on cardboard substrates have, in the past, also been activated, i.e., softened, plasticized, or liquidized, by hot air applied directly to the synthetic coatings. Activation of a synthetic coating by the direct application of heat thereto becomes difficult when the synthetic coating is a polyester, because the intense heat required to activate the polyester causes residual water in the cardboard, which residual water constitutes about 6% or 7% of the volume or weight of the substrate, to evaporate and explode, thereby bursting the cardboard substrate. Also, care must be taken to apply sufficient heat to the synthetic coating to maintain the activation state of the synthetic materials during transportation of the blanks to a shaping station.

SUMMARY OF THE INVENTION

Many of the disadvantages and shortcomings of the prior art devices discussed above are overcome by a new and improved apparatus for heating a synthetic coating disposed on a surface of a cardboard blank to a temperature sufficiently high to soften the synthetic coating. In accordance with the improvement, heat transferred from the synthetic coating to the cardboard blank is inhibited from raising the temperature of a predetermined portion of the cardboard blank beyond a selected value, which if exceeded could detrimentally affect the cardboard blank. In one embodiment, the apparatus includes heating means for heating a predetermined portion of the synthetic coating and cooling means, positioned adjacent the heating means, for inhibiting heat supplied to the synthetic coating by the heating means from being transferred to portions of the synthetic coating other than the predetermined portion thereof.

If the transfer of heat from the synthetic coating to the cardboard blank is inhibited to a sufficient extent, the present invention can effectively prevent the heat applied to the synthetic coating from having a deleterious effect on a cardboard blank. Also, by inhibiting the transfer of heat from the synthetic coating to the cardboard blank, predetermined areas of the cardboard blank can be maintained at a relatively low temperature, thereby rendering the blank more rigid and easier to shape and handle.

If the blank has a generally rectangular shape, the heating means may advantageously include a plurality of jets, each of which discharges a stream of hot air towards a corresponding corner of the blank. Each of the jets has an associated cooling member positioned generally between the jet and the central portion of the cardboard blank. By this arrangement, the heat applied to the synthetic coating, which could be disposed on opposite surfaces of the blank, by the hot air streams is confined to predetermined portions of the cardboard blank, i.e., the corners thereof, so that the central or interior portions of the cardboard blank are not heated to a temperature which would produce evaporation of the residual water in the cardboard blank and the resulting bursting of the cardboard. The steam formed in the corners of the cardboard blank can be diffused therefrom through an uncoated peripheral edge of the blank.

If the cardboard blank has angled corner edges, each of the jets may be provided with an inner lip, an outer lip and a generally V-shaped outlet slot formed between the lips. Thus, the outlet slot can have a shape which generally matches the shape of the angled corners of the blank, thereby facilitating uniform and efficient application of hot air to the corners of the blank. By making the inner lip longer than the outer lip, the stream of hot air discharged from the outlet slot formed therebetween can be more readily steered away from the central portion of the blank, so that the cooling effect of an adjacent cooling member is not detrimentally affected by the heat of the hot air stream.

In a preferred embodiment of the invention, a first pair of cooling members is attached to a first track and a second pair of cooling members is attached to a second track. Each of the tracks has a guide groove for receiving a peripheral edge of a generally flat blank so that the blank can be pushed or pulled along the tracks by a suitable feed mechanism. A slot formed between the cooling members of each pair of cooling members is provided so that the blank can be fed between the cooling members. A suitable coolant can be conveyed through the cooling members and the tracks.

BRIEF DESCRIPTION OF THE DRAWINGS

For a more complete understanding of the invention, reference may be had to the following detailed description of an exemplary embodiment taken in conjunction with the accompanying figures of the drawings, in which.

DESCRIPTION OF AN EXEMPLARY EMBODIMENT

Figure 1:
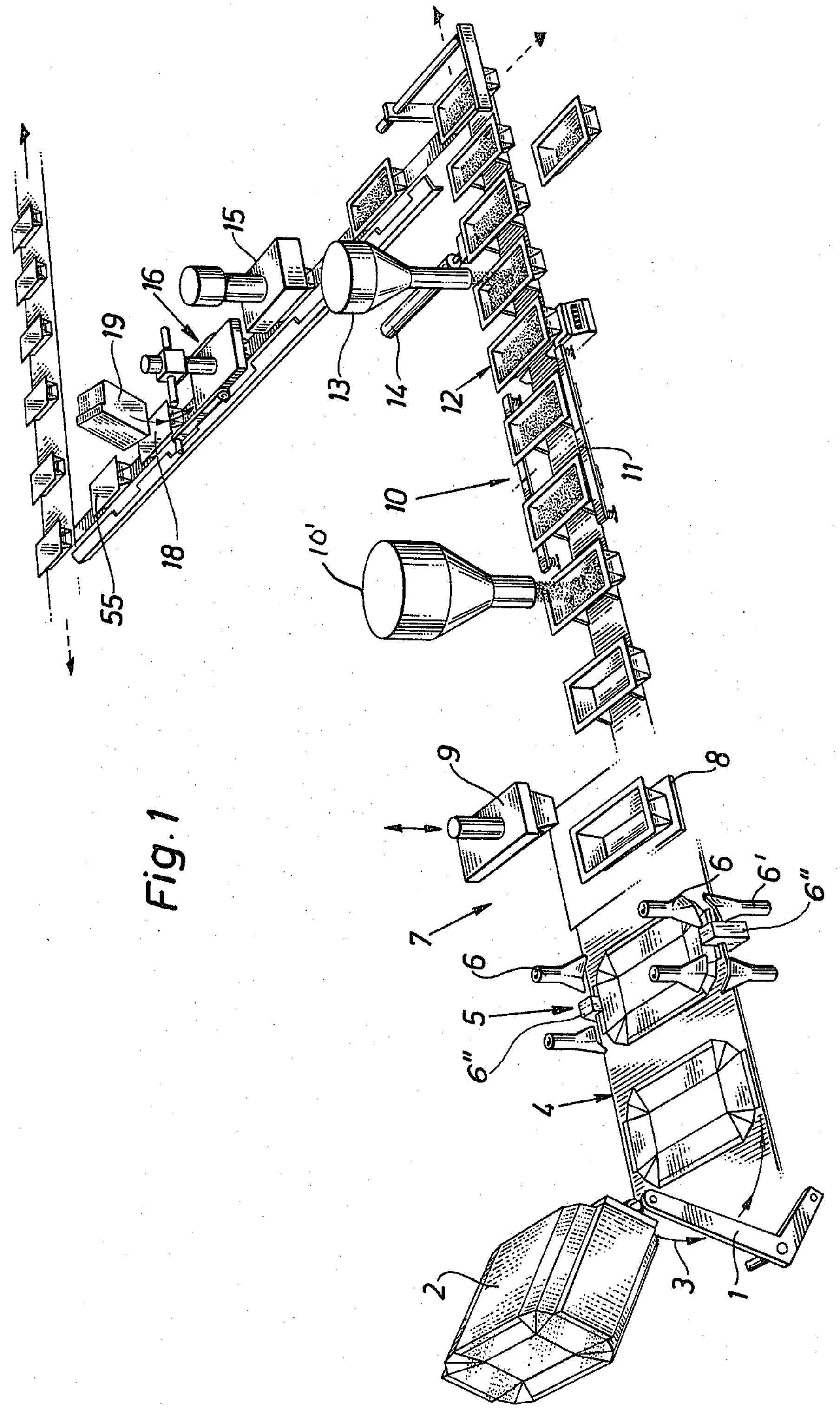
FIG. 1 is a perspective view schematically illustrating an assembly line for manufacturing bowl-shaped containers out of cardboard blanks coated with a synthetic material.

Referring to FIG. 1, there is shown an assembly line including an unloading device 1 adapted to remove the lowermost one of a plurality of stacked blanks 2 and pivot it, in a direction indicated by arrow 3, to a feed mechanism 4. At activation station 5, jets 6, 6' blow hot air onto the blank, which has been transported to the activation station 5 by the feed mechanism 4, while a cooling device 6'' creates cold barriers adjacent the jets 6, 6' to inhibit the overheating of the interior or central portions of the blank. After the blank has been sufficiently heated at the activation station 5, the heated blank is transported to shaping station 7 where the blank is formed into a bowl-shaped container by a die 8 and a press 9, which cooperate with each other to fold and set up the blank. At station 10, a preliminary filling operation is performed by a funnel 10', a shaking operation is performed by a shaker 11, a weighing operation is performed at substation 12, and a secondary filling operation is performed by funnel 13. Any unfilled container can be removed using an ejector 14. The feed direction of the filled containers is changed, so that they can be brought under a hot air shower 15 and then into a lid applying station 16, where a lid 19 is removed from a stack of lids, pivoted in a direction indicated by arrow 18 and sealed to the container. The completed container 20 is then transported for further handling.

Figure 2:
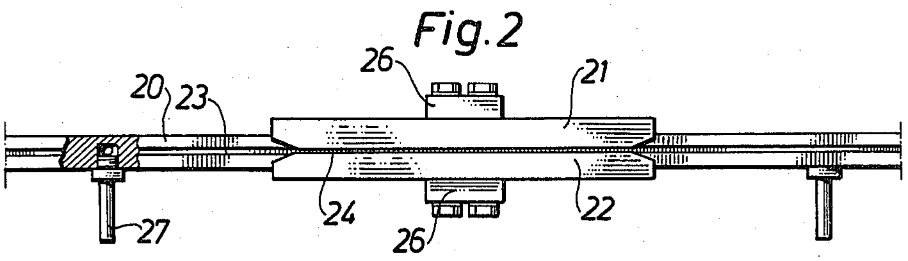
FIG. 2 is a side elevational view of a cooling device constructed in accordance with one aspect of the present invention, portions of the cooling device being broken away to facilitate consideration and discussion.
Figure 3:
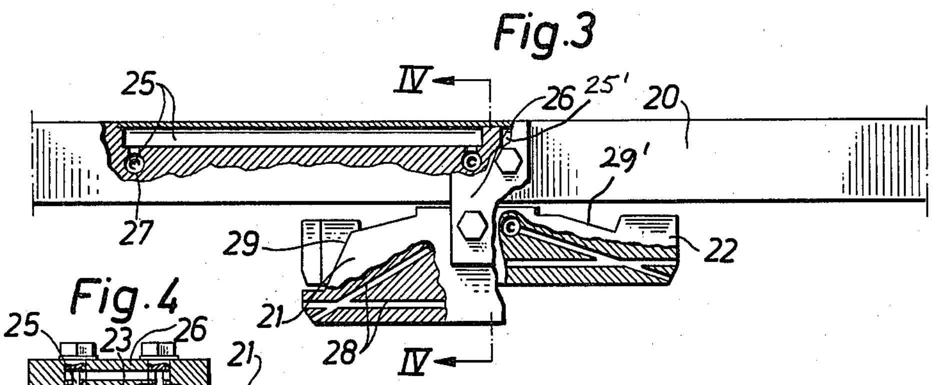
FIG. 3 is a plan view of the cooling device of FIG. 2, portions of the cooling device being broken away to facilitate consideration and discussion.
Figure 4:
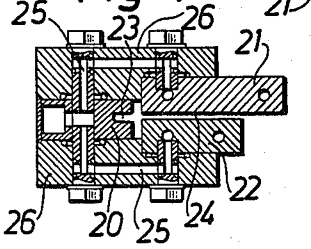
FIG. 4 is a cross-sectional view, taken along the line IV—IV in FIG. 3 and looking in the direction of the arrows, of the cooling device shown in FIGS. 2 and 3.
Figure 5:
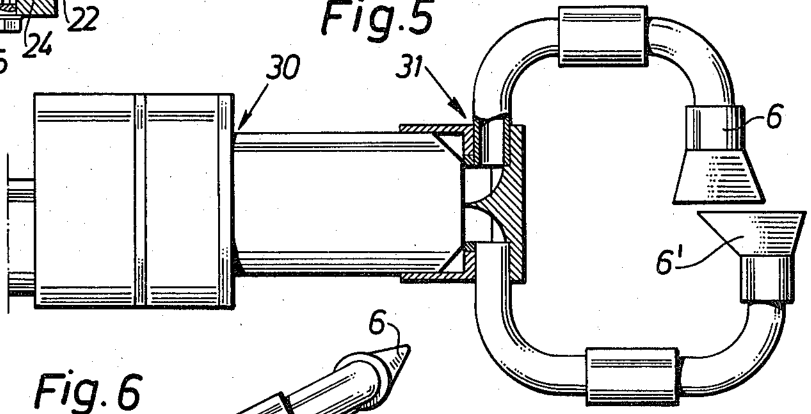
FIG. 5 is a cross-sectional view, taken along the line V—V in FIG. 6 and looking in the direction of the arrows, of a heating device constructed in accordance with another aspect of the present invention, portions of the heating device being broken away to facilitate consideration and discussion.
Figure 6:
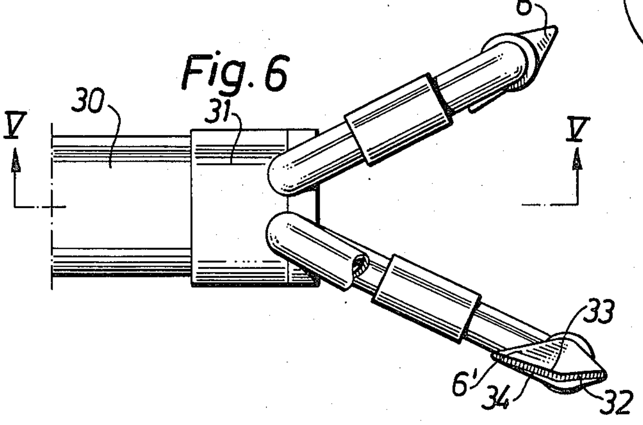
FIG. 6 is a top view of the heating device shown in FIG. 5, portions of the heating device being broken away to facilitate consideration and discussion.
Figure 7:
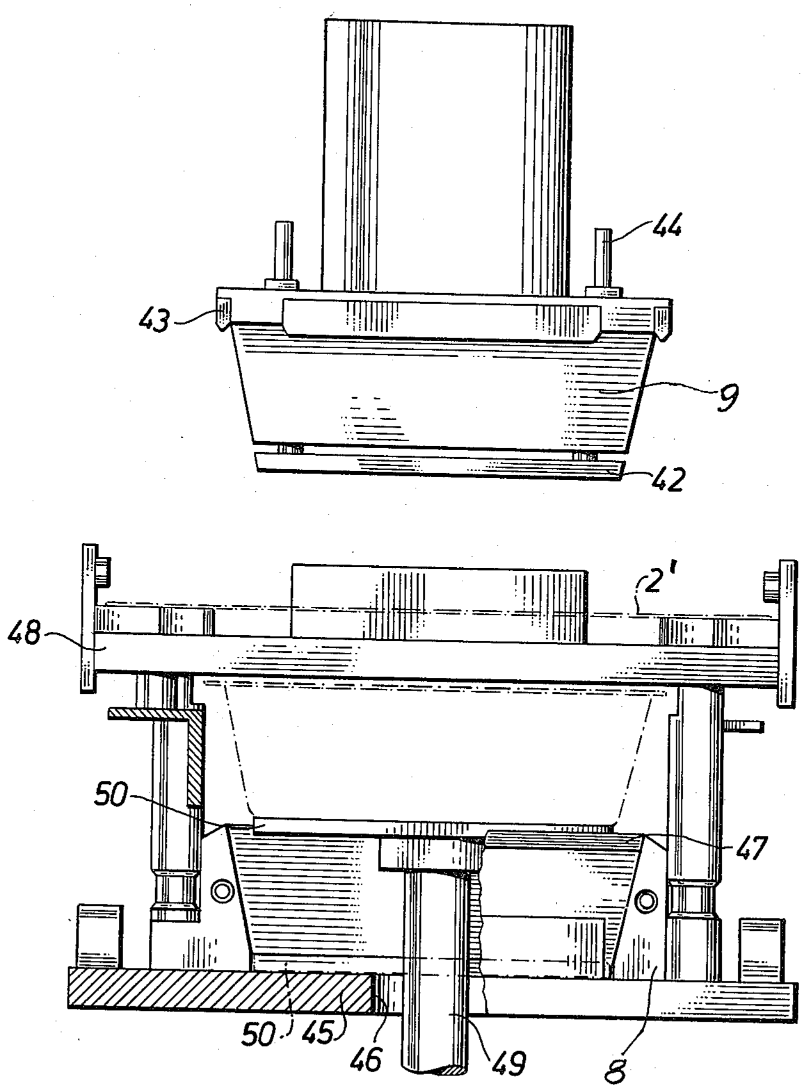
FIG. 7 is a side elevational view of a shaping tool used on the assembly line illustrated in FIG. 1, portions of the shaping tool being broken away to facilitate consideration and discussion.

Before one of the blanks 2 is transported to the shaping station 7, which is shown in greater detail in FIG. 7, activation of synthetic heat-sealing material applied to at least one planar surface of the blank occurs at the activation station 5, which is shown in greater detail in FIGS. 2–6. With reference to FIGS. 2–4, the cooling device 6'' of the activation station 5 includes a pair of parallel tracks 20 (only one of which is shown in FIGS. 2–4) and cooling members 21, 22. Each of the tracks 20 has a guide groove 23 in which a peripheral edge of the blank runs. When the blank is transported to the activation station 5, it is fed directly into a guide slot 24 formed between the cooling members 21, 22, which are arranged generally one above the other. Each of the tracks 20 includes channels 25, 25', which are also formed in a connector 26 attached between the cooling members 21, 22. Thus a coolant, such as water, can be conveyed from a nipple 27 through the track 20 and the connector 26 into the upper cooling member 21. After flowing through channels 28 formed in the upper cooling member 21, the coolant passes through the connector 26 and back into the track 20. A similar flow path is also provided for circulating the coolant between the track 20 and the lower cooling member 22.

One of the upper jets 6 is positioned substantially adjacent a surface 29 of a corresponding one of the upper cooling members 21, while one of the lower jets 6' is positioned substantially adjacent surface 29' of a corresponding one of the lower cooling member 22. By this arrangement, hot air applied to a predetermined portion of the synthetic coating of one of the blanks also warms the cardboard blank directly above or below the predetermined portion of the coating, causing evaporation of residual moisture contained in the cardboard blank and the production of steam which is discharged through an uncoated peripheral edge of the blank. Because the cooling members 21, 22 create cold barriers adjacent the jets 6, 6' so as to inhibit heat supplied by the jets 6, 6' from being transferred to the interior or central portions of the blank, explosive bursting of these portions of the cardboard blank is prevented.

Referring to FIGS. 5 and 6, the jets 6, 6' are supplied with hot air from a heater 30 through a manifold 31 which is designed so as to provide a uniform distribution of the hot air to the upper jets 6 and the lower jets 6'. Each of the jets 6, 6' has a generally V-shaped outlet slot 32, which is formed between an inner lip 33 and an outer lip 34. The outlet slots 32 discharge hot air towards an underlying or overlying blank. Each of the lower jets 6' is positioned so that it projects outwardly from the heater 30 further than a corresponding one of the upper jets 6, in order to compensate for the projection of the lower corner edge of the blank beyond a corresponding upper corner edge of the blank. The shape of the outlet slots 32 permits each one to discharge a hot air stream at the exact center of a portion of the blank to be heated.

Referring to FIG. 7, the press 9 includes a spring-mounted rejector 42 designed to remove a container which has been shaped by the press 9 and the die 8. A shaping strip 43 bends the edges of the blanks at an upward angle of about 30° and then presses them in place. A coolant is supplied to and discharged from the press 9 through conduits 44. The die 8 is attached to a base plate 45, which has an opening 46. The die 8 includes an upper edge 47, a frame 48, a rejector plate 50, and a spring-operated rejector 49 which projects through the opening 46 of the base plate 45 and is attached to the rejector plate 50. A flat blank 2' is delivered to the die 8 and after shaping by the press 9 and the die 8 assumes a bowl-shape (as indicated by the dotted lines).

It will be understood that the embodiment described herein is only exemplary and that a person skilled in the art may make many variations and modifications without departing from the spirit and scope of the invention. All such modifications and variations are intended to be included within the scope of the invention as defined in the appended claims.

We claim:

1. Apparatus for heating a synthetic coating disposed on two opposite surfaces of a rectangularly-shaped cardboard blank to a temperature sufficiently high to soften the synthetic coating, comprising heating means for heating the synthetic coating, said heating means including a plurality of jets, at least one of said jets being arranged so as to discharge hot air towards one of the two opposite surfaces of the cardboard blank in the direction of a corner thereof and at least another one of said jets being arranged so as to discharge hot air towards the other of the two opposite surfaces of the cardboard blank in the direction of a corner thereof, and inhibiting means for inhibiting heat transferred from the synthetic coating to the cardboard blank from raising the temperature of a predetermined inner portion of the cardboard blank beyond a selected value, which if exceeded could detrimentally affect the cardboard blank, said inhibiting means including a first cooling member positioned alongside a peripheral edge of the cardboard blank and adjacent the synthetic coating disposed on said one surface of the cardboard blank and a second cooling member positioned alongside a peripheral edge of the cardboard blank and adjacent the synthetic coating disposed on said other surface of the cardboard blank, each of said first and second cooling members having conveying means for conveying coolant through said first and second cooling members.

2. Apparatus according to claim 1, wherein said cooling members are spaced apart from each other by a predetermined distance selected to permit the cardboard blank to pass between said cooling members.

3. Apparatus according to claim 1, wherein said conveying means includes a plurality of channels formed in said cooling members.

4. Apparatus according to claim 1, wherein said inhibiting means further includes a third cooling member positioned adjacent the synthetic coating disposed on said one surface of the cardboard blank and a fourth cooling member positioned adjacent the synthetic coating disposed on said other surface of the cardboard blank, each of said third and fourth cooling members having conveying means for conveying coolant through said third and fourth cooling members.

5. Apparatus according to claim 4, wherein said first and second cooling members are attached to a first track and said third and fourth cooling members are attached to a second track, said first and second tracks being generally parallel to each other, each of said first and second tracks having guiding means for guiding a corresponding peripheral edge of the cardboard blank.

6. Apparatus according to claim 5, wherein said guiding means includes a first groove formed in said first track and a second groove formed in said second track.

7. Apparatus according to claim 4, wherein each of said first and third cooling members extends between at least one pair of adjacent jets located on said one side of the cardboard blank and each of said second and fourth cooling members extends between at least one pair of adjacent jets located on said other side of the cardboard blank.

8. Apparatus according to claim 1, wherein each of said jets includes an outer lip, an inner lip and an outlet slot formed between said lips, said inner lip being longer than said outer lip.

9. Apparatus according to claim 8, wherein said outlet slot is generally V-shaped.

10. Apparatus according to claim 1, wherein said synthetic coating is made from a heat-sealing synthetic material.

* * * * *